US008008218B2

(12) United States Patent
Small, Jr. et al.

(10) Patent No.: US 8,008,218 B2
(45) Date of Patent: *Aug. 30, 2011

(54) MULTI-LAYERED TEXTILE STRUCTURES FOR FLAME RESISTANT MATTRESSES

(75) Inventors: James Douglas Small, Jr., Greensboro, NC (US); John H. Walton, Greensboro, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/870,804

(22) Filed: Oct. 11, 2007

(65) Prior Publication Data
US 2008/0045110 A1 Feb. 21, 2008

Related U.S. Application Data

(63) Continuation-in-part of application No. 11/639,883, filed on Dec. 15, 2006, now abandoned.

(60) Provisional application No. 60/750,851, filed on Dec. 15, 2005.

(51) Int. Cl.
*B32B 5/26* (2006.01)
*B27N 9/00* (2006.01)

(52) U.S. Cl. ........ 442/381; 442/136; 442/414; 428/920; 428/921; 156/73.1; 156/280; 156/278

(58) Field of Classification Search .................. 442/136, 442/381, 414; 428/920, 921; 156/73.1, 278, 156/280
See application file for complete search history.

(56) References Cited

U.S. PATENT DOCUMENTS

| 2004/0092184 A1* | 5/2004 | Kingman ...................... 442/136 |
| 2004/0226100 A1* | 11/2004 | Small et al. ....................... 5/698 |
| 2005/0026528 A1* | 2/2005 | Forsten et al. ................. 442/414 |
| 2005/0095936 A1* | 5/2005 | Jones et al. ..................... 442/136 |
| 2007/0066175 A1* | 3/2007 | Wolf et al. ..................... 442/415 |
| 2007/0283493 A1* | 12/2007 | Link et al. ......................... 5/483 |
| 2007/0293114 A1* | 12/2007 | Ogle ............................. 442/414 |

OTHER PUBLICATIONS

"ticking", Google Dictionary, accessed Nov. 10, 2010.*

* cited by examiner

*Primary Examiner* — Norca L Torres Velazquez
(74) *Attorney, Agent, or Firm* — Myers Bigel Sibley & Sajovec, P.A.

(57) ABSTRACT

Mattress panels and mattresses (including mattress foundations) that satisfy the rigorous requirements of new and promulgated state and federal regulations regarding flammability of mattresses, such as Technical Bulletin 603 of the State of California department of Consumer Affairs (TB-603) and U.S. Consumer Product Safety Commission Standard for Flammability of Mattresses and Mattress/Foundation Sets (16 CFR 1633), are provided. A mattress includes one or more panels of material assembled as a non-quilted, non-perforated, multi-layered structure, wherein the mattress maintains flame and heat resistant integrity when impinged with a gas flame in accordance with the testing protocol set forth in Technical Bulletin 603 of the State of California department of Consumer Affairs (TB-603) and/or in accordance with the testing protocol set forth in U.S. Consumer Product Safety Commission Standard for Flammability of Mattresses and Mattress/Foundation Sets (16 CFR 1633).

18 Claims, No Drawings

MULTI-LAYERED TEXTILE STRUCTURES FOR FLAME RESISTANT MATTRESSES

RELATED APPLICATION

This application is a continuation-in-part application of U.S. patent application Ser. No. 11/639,883, filed Dec. 15, 2006 now abandoned, which claims the benefit of U.S. Provisional Application No. 60/750,851, filed Dec. 15, 2005, the disclosures of which are incorporated herein by reference in their entireties as if set forth fully herein.

FIELD OF THE INVENTION

The present invention relates generally to fire prevention and, more particularly, to rendering upholstered articles fire resistant.

BACKGROUND

There is heightened awareness of fire prevention in homes and businesses in the United States. This awareness has led to the development of standards and legislation directed to reducing the risk of fires, particularly with respect to bedding and upholstered furniture. Conventional fire prevention techniques for bedding and upholstered furniture involve the topical application of flame retardant chemicals directly to an outer decorative layer of upholstery material.

However, recently passed legislation may render conventional fire protection techniques for bedding (particularly mattresses) inadequate. For example, the cigarette burn test for measuring flame resistance (developed by the Upholstered Furniture Action Council) has been deemed inadequate by the state of California and by the U.S. Consumer Product Safety Commission. In addition, new regulations being promulgated in some states and at the federal level prohibit the sale or manufacture of mattresses that do not pass these new flammability tests.

For example, California Technical Bulletin 603 of the State of California Department of Consumer Affairs (hereinafter "TB-603"), which is incorporated herein by reference in its entirety, exposes the top and side panels of a mattress to an open gas flame to simulate the effects of burning bedclothes. TB-603 is extremely aggressive relative to conventional cigarette burn test and many industry analysts are skeptical that conventional upholstered furniture and bedding products (e.g., mattresses, etc.) will be able to pass TB-603. Aggressive federal standards for flammability of mattresses are currently being proposed by the U.S. Consumer Product so Safety Commission and are described in the Federal Register at 16 CFR 1633 (hereinafter "16 CFR 1633").

In addition, material that can prevent the propagation of flame into the core cushioning material of furniture, and institutional bedding is desired. California Technical Bulletin 117 of the State of California Department of Consumer Affairs (hereinafter "TB-117"), which is incorporated herein by reference in its entirety, provides testing for upholstered furniture, and California Technical Bulletin 129 of the State of California Department of Consumer Affairs (hereinafter "TB-129"), which is incorporated herein by reference in its entirety, provides testing for institutional bedding.

In some cases, even though an upholstery fabric or ticking is constructed of inherently flame resistant material, it may be permeable such that heat and hot gases may be transmitted through the fabric causing internal materials to ignite. Furthermore, conventional methods of assembling mattresses and upholstered furniture may produce seams and joints that cannot withstand these new flammability tests without splitting open and subjecting flammable interior materials to flame. Also, pores formed in bedding fabrics as a result of sewing, seaming, quilting, and/or the attachment of labels, handles, decorations, vents, etc., may be penetrated by flames and hot gases which may result in the combustion of interior materials.

The top and side panels of a mattress are typically composed of layers of material. Typically the outer layer is a decorative ticking fabric that is a high quality knit or woven textile. The next layer is typically a cushioning layer, such as foam, batting, or other lofty, soft material. The cushioning layer provides a plump, soft, feel and texture to the panel. The next layer is typically a backing fabric that supports the cushioning material and provides strength and dimensional stability to the panel. The backing layer may be optional if the second layer is strong enough and stable enough to support the structure. Additionally, some mattress or upholstery panels are flat and do not have significant 'plumping' or cushioning, but must still provide the insulation and flame resistance required by the new standards. The backing layer is conventionally a polyester or polypropylene nonwoven fabric, a knit, or a woven fabric. The layers of a mattress panel are typically assembled via stitch quilting. Stitching, however, may create unacceptable compression and perforation of a structure, and may negatively affect flame and heat resistance of the mattress. Conventionally, a flame and heat blocking component is added to the panel when the panel is designed to resist heat, fire, or ignition.

Filler cloth panels may or may not be multi-layered when providing flame resistant protection. If multi-layered, the outer layer may or may not be decorative, but usually is comprised of a stitchbonded, needlepunched, hydroentangled, or spunbonded fabric treated or designed to provide a desired coefficient of friction in addition to the required flame resistance.

To prevent the ignition of the core of a mattress, or other upholstered article, a variety of flame resistant materials have been utilized in the construction of top and side panels for mattresses. For example, fabrics made from graphite, carbon, para-aramid, or other flame and heat resistant fibers have been used. Batting composed of flame resistant fibers or fibers that char, such as silica modified rayon (or Visil), modacrylic, FR rayon, FR polyester, melamine, or other suitable fibers may be produced such that at high basis weights can provide flame resistance and insulation. Foams may be chemically treated with flame retardant or impregnated with graphite. Fabrics may also be treated with flame retardant and/or intumescent chemical compositions or impregnated with intumescent chemicals to provide flame blocking and insulative properties.

In addition, the use of thermoplastic backing fabrics in mattress construction, such as a polypropylene spunbonded nonwoven, may result in the melting and shrinking away of the backing fabric when exposed to heat and/or flame. This shrinking or opening force can draw cracks and holes into the mattress structure when the mattress is exposed to high heat. Additionally, molten thermoplastic can soak into the cushioning material and increase flammability of the mattress. Unless an appropriate fire resistant bottom panel is utilized, fire can enter from beneath a mattress or foundation, or upholstered furniture, and propagate across the inside surface of the flame resistant panel.

U.S. Pat. No. 6,823,548 to Murphy describes a flame and heat resistant material wrapped around the core of a mattress. The flame resistant material is separate from the aesthetic ticking of the mattress exterior and requires additional processing which may add to manufacturing costs. Moreover, the Murphy flame resistant material risks the loss of protection if misalignment occurs between the material and a mattress core, and the protection cannot be varied for the different challenges seen in the various parts of the mattress or foundation.

Multi-layer panels for conventional mattresses are constructed by acquiring separate layers of material and joining them together. For example, see U.S. Pat. No. 6,954,956 to Diaz and U.S. Pat. No. 4,504,991 to Klanczik. In order to provide resistance to high temperatures of a flame, and to provide strength to the panel structure after burning, conventional multi-layer mattress panels require the use of high temperature fibers that are inherently flame resistant and that do not melt or decompose at temperatures around 500° F. (260° C.)). Examples of such fibers include aramid fibers, carbon fibers, glass fibers, polybenzimidazole fibers and Visil® brand fibers, which can be expensive.

In addition, multi-layer panels for conventional mattresses may be treated with intumescent coatings. Unfortunately, these coatings can be thick and heavy and can impart an undesirable stiffness, loss of loft and cushioning to the mattress panels. In addition, intumescent coatings can add considerably to the expense of conventional mattress panels.

SUMMARY

In view of the above discussion, methods of producing mattress panels and mattresses (including mattress foundations) that satisfy the rigorous requirements of new and promulgated state and federal regulations regarding flammability of mattresses, such as Technical Bulletin 603 of the State of California department of Consumer Affairs (TB-603) and U.S. Consumer Product Safety Commission Standard for Flammability of Mattresses and Mattress/Foundation Sets (16 CFR 1633), are provided. According to some embodiments of the present invention, a method of producing a multi-layered flame and heat resistant panel includes applying a chemical flame retardant finish to first and second nonwoven fabric layers and then laminating (i.e., bonding) the first and second nonwoven fabric layers in face to face contacting relationship to form a non-quilted, non-perforated, multi-layered panel. Alternately, the first and second layers may be laminated and then the flame retardant chemistry is applied to the multi layer structure. The first and second nonwoven fabric layers may be laminated together using an adhesive, adhesive web, adhesive film, binder fiber, binder powder or adhesive agent, or may be laminated together using thermal or ultrasonic bonding. The panel is configured to maintain flame and heat resistant integrity when impinged with a gas flame in accordance with the testing protocol set forth in TB-603. Each of the first and second nonwoven fabric layers are relatively lofty nonwoven fabrics comprised of standard inexpensive non-flame resistant, non-heat resistant fibers. These layers are bonded together them in such a way as to not perforate or significantly compress the panel structure. As such, a unique high performance panel structure can be created that provides heat and flame resistance and residual char strength that is equal to panel structures that require expensive high temperature fibers and/or thick heavy intumescent coatings.

According to some embodiments of the present invention, a method of manufacturing a mattress includes producing a multi-layered flame and heat resistant panel that includes applying a chemical flame retardant finish to a first nonwoven fabric layer of non-flame resistant fibers, applying a chemical flame retardant finish to a second nonwoven fabric layer of non-flame resistant fibers, and laminating the first and second nonwoven fabric layers in face to face contacting relationship to form a non-quilted, non-perforated, multi-layered panel, wherein the panel maintains flame and heat resistant integrity when impinged with a gas flame in accordance with the testing protocol set forth in TB-603. The multi-layered panel is then attached to a mattress core (e.g., a spring set, a foam core, or foundation).

The multi-layered flame and heat resistant panel may be utilized as a border panel, top panel, bottom panel, and/or filler cloth panel. According to some embodiments of the preset invention, the multi-layered flame and heat resistant panel may include a layer of flame resistant cushioning material positioned between the first and second nonwoven fabric layers. As described above, the first and second nonwoven fabric layers may be laminated together using an adhesive, adhesive web, adhesive film, binder fiber, binder powder or adhesive agent, or may be laminated together using thermal or ultrasonic bonding.

According to some embodiments of the present invention, a mattress includes one or more panels of material assembled as a non-quilted, non-perforated, multi-layered structure, wherein the mattress maintains flame and heat resistant integrity when impinged on a front side thereof with a gas flame in accordance with the testing protocol set forth in TB-603 and/or in accordance with the testing protocol set forth in U.S. Consumer Product Safety Commission Standard for Flammability of Mattresses and Mattress/Foundation Sets (16 CFR 1633). Panels for mattress construction include border panels, top panels, bottom panels, and filler cloth.

According to some embodiments of the present invention, a non-quilted, non-perforated mattress panel, includes a backing layer and an outer layer fabric laminated to the backing layer. The panel maintains flame and heat resistant integrity when impinged on a front side thereof with a gas flame in accordance with testing protocol set forth in TB-603. The backing layer and outer layer may be laminated together using an adhesive, adhesive web, adhesive film, binder fiber, binder powder or adhesive agent. The backing layer and outer layer may be laminated together using thermal or ultrasonic bonding.

According to some embodiments of the present invention, a mattress panel (and mattresses constructed therefrom), after being exposed to a flame on a front side thereof for 50 seconds in accordance with the PFG Test, maintains flame and heat resistant integrity, has a temperature on a back side of the panel that does not exceed about 435° C., and has a char strength that is greater than or equal to about two (2) Newtons.

According to some embodiments of the present invention, a mattress panel (and mattresses constructed therefrom), after being exposed to a flame on a front side thereof for 50 seconds in accordance with the PFG Test, maintains flame and heat resistant integrity, has a temperature on a back side of the panel that does not exceed about 400° C., and has a char strength that is greater than or equal to about four (4) Newtons. According to some embodiments of the present invention, a mattress panel (and mattresses constructed therefrom), after being exposed to a flame on a front side thereof for 50 seconds in accordance with the PFG Test, maintains flame and heat resistant integrity, has a temperature on a back side of the panel that does not exceed about 370° C., and has a char strength that is greater than or equal to about eight (8) Newtons.

According to some embodiments of the present invention, a mattress panel includes a backing layer, an outer layer, and a layer of flame resistant cushioning material positioned between the backing layer and outer layer. The backing layer, cushioning layer and outer layer are laminated together such that the cushioning layer is not perforated, and any compression resulting from the lamination process is relieved during flame exposure. The panel maintains flame and heat resistant integrity when impinged on a front side thereof with a gas flame in accordance with testing protocol set forth in TB-603 and/or U.S. Consumer Product Safety Commission Standard for Flammability of Mattresses and Mattress/Foundation Sets (16 CFR 1633). The backing layer, cushioning layer, and outer layer may be laminated together using an adhesive, adhesive web, adhesive film, binder fiber, binder powder or adhesive agent. The backing layer, cushioning layer, and outer layer may be laminated together using thermal or ultrasonic bonding.

According to some embodiments of the present invention, a mattress panel (and mattresses constructed therefrom), after being exposed to a flame on a front side thereof for 50 seconds in accordance with the PFG Test, the panel maintains flame and heat resistant integrity, has a temperature on a back side of the panel that does not exceed about 415° C., and has a char strength that is greater than or equal to about two (2) Newtons. According to some embodiments of the present invention, a mattress panel (and mattresses constructed therefrom), after being exposed to a flame on a front side thereof for 50 seconds in accordance with the PFG Test, the panel maintains flame and heat resistant integrity, has a temperature on a back side of the panel that does not exceed about 370° C., and has a char strength that is greater than or equal to about four (4) Newtons. According to some embodiments of the present invention, a mattress panel (and mattresses constructed therefrom), after being exposed to a flame on a front side thereof for 50 seconds in accordance with the PFG Test, the panel maintains flame and heat resistant integrity, has a temperature on a back side of the panel that does not exceed about 350° C., and has a char strength that is greater than or equal to about eight (8) Newtons.

By constructing mattress and/or foundation panels using the concepts embodied in this invention, significant mattress weight reduction is possible with comparable and/or improved flame and heat resistance to conventional panels. Moreover, the improved laminated panels therefore can be lighter and/or thinner, thereby providing improved handling and manufacturability.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "mattress", as used herein, is intended to include mattresses and mattress foundations (e.g., box springs, etc.), without limitation.

The term "mattress panel", as used herein, is intended to include panels for mattresses and panels for mattress foundations. Thus, the term "mattress panel" includes panels used to construct mattresses and panels used to construct mattress foundations.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

The "back side" of any mattress panel is defined as the side of the panel that faces the internal core of a mattress/mattress foundation. Accordingly, the "front side" of any mattress panel is the side of the panel that faces outwardly away from the internal core of a mattress/mattress foundation (i.e., the front side is the opposite side from the back side of a panel). A mattress panel front side is the side that will be impinged with a flame according to the various tests described herein and that will be exposed to flame/heat in an actual fire event. Which side of a mattress panel is the front side and which side is the back side would be understood by one skilled in the art of the present invention.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention.

Embodiments of the present invention provide multilayered textile structures that may be used to help protect internal combustible mattress materials when mattresses are exposed to external ignition sources such as open flames or smoldering cigarettes. Applicants have unexpectedly discovered that when a flame resistant barrier material is incorporated into a mattress as a laminated structure that includes exterior aesthetic fabrics, a synergistic effect causes the entire structure to display improved flame and heat resistant properties compared with conventional mattress structures where multiple layers of material are quilted together. Additionally, embodiments of the present invention eliminate the need for quilting operations and other operations that cause perforations typically used in the industry to manufacture both border panels and top or bottom panels of mattresses and foundations. Eliminating the quilting process, and the perforations caused thereby, provides improved flammability performance, improved heat resistance and high temperature insulation. An additional benefit to eliminating the quilting process is that significant cost savings and increased production capacity can be realized.

Moreover, Applicants have unexpectedly found that by taking relatively lofty nonwoven fabrics composed of standard non-flame resistant, non-heat resistant fibers and treating them completely throughout with flame retardant chemistry, and then bonding them in such a way as to not perforate or significantly compress them, a unique high performance structure can be created that provides heat and flame resistance and residual char strength that is equal to structures that require expensive high temperature fibers and/or thick heavy intumescent coatings. The layers of a multilayer panel, according to embodiments of the present invention, are bonded in such a way as to provide a unitary part for use in mattress construction. These unitary panels prevent ignition and provide protection to internal components of a mattress. Moreover, these unitary panels retain significant strength after flame exposure.

Applicants have unexpectedly discovered that inexpensive non-flame resistant and non-heat resistant fibers (e.g., fibers that decompose or melt around 500° F. (260° C.)) or less when treated with a flame retardant chemistry and bonded into a multi-layered part can provide a unique combination of flame resistance, temperature blocking, and charred strength. This can be demonstrated by the following.

Multi-layer panels, according to embodiments of the present invention, are at least equal to and, in many cases, superior to considerably more expensive high temperature fibers.

Evaluation of Stitchbond w/ Various FR Fibers

|  |  |  | TAP | TAPP | TPZP | Standard two layer with standard fiber |
|---|---|---|---|---|---|---|
| Blend |  |  |  |  |  |  |
| Tencel |  | % | 90 | 70 | 70 | 92 |
| m-aramid |  |  | 10 | 10 |  |  |
| polyester |  |  |  | 20 | 20 | 18 |
| PPS |  |  |  |  | 10 |  |
| Greige |  |  |  |  |  |  |
| Basis Weight |  | osy | 3.4 | 3.8 | 3.60 | 5.0 |
| Grab Tensile | XD | lb/in | 18.5 | 19.5 | 16.9 |  |
| Finished |  |  |  |  |  |  |
| Basis Weight |  | osy | 4.32 | 4.8 | 4.75 | 6.3 |
| Grab Tensile | MD | lb/in | 43.9 | 44.5 | 43.3 | 49 |
|  | XD |  | 38 | 56.7 | 45.3 | 52 |
| Trap Tear | MD | lbs | 15.3 | 21.9 | 21.5 |  |
|  | XD |  | 11.3 | 13.9 | 11.8 |  |
| Burn—Max Temp |  | F. | 752 | 759 | 761 | 712 |
| Char Strength |  | N | 8.6 | 11.8 | 7.8 | 7.5 |

As can be seen from the above, the basis weight of the standard, non FR, and not temperature resistant, standard sample, the cost of these raw materials is lower than the products with the high temperature aramid, or polyphenylene sulfide fiber, and the result is equivalent char strength and improved thermal resistance.

Embodiments of the present invention provide improved multi-layered textile structures that may be flame resistant as defined by various test procedure(s) discussed herein, and are useful, particularly, for constructing mattresses and foundations to meet various open flame standards such as TB-603 and the proposed Federal standard 16 CFR Part 1633. According to embodiments of the present invention, multi-layered structures comprise at least two layers, one of which is a decorative ticking or other functional outer layer material laminated to a second backing layer that provides flame resistance and, if desired, sufficient cushioning. Additional layers may be positioned between the first and second layers to provide for additional cushioning or other aesthetic qualities. When utilizing multi-layered structures, according to embodiments of the present invention, the necessity for quilting the layers together can be eliminated.

Multi-layered structures, according to embodiments of the present invention, may be formed by one or more process steps using bonding methods such as thermal, ultrasonic, thermally activated powders, adhesive webs, binding fibers, adhesives, adhesive resins, foam adhesives, and the like.

It is important, when implementing embodiments of the present invention, that the lamination process not significantly compress any portion of a panel of material or perforate any portions of a panel. Because embodiments of the present invention do not overly compress, perforate, or fuse throughout the thermally resistant layers within the multi-layered structures, improvements in the flame resistance performance for a mattress side, top, or bottom panel can be realized. Standard industry practice is to quilt multiple layers of a mattress panel using stitching. These quilting patterns unacceptably compress the structure along the sewn lines and perforate the structure. Although, the quilting compresses only a limited area of the panel, significant reductions in heat resistance are observed.

While it is preferred that a panel be uncompressed, it is possible under the constraints of this invention to emboss or pattern a structure for aesthetic effect. This can be done by first embossing the outer decorative layer before creating a laminated panel, or by embossing the total panel using thermoplastic means that will release under the heating created by flame exposure. In no case is it acceptable to perforate the panel, as happens with stitching, or compressing or through bonding the structure such to create portals for flame or heat passage.

EXAMPLES

A series of laminated structures were produced using a standard industry ticking, a flame resistant cushioning layer of various basis weights, and a backing fabric with flame retardant properties. Samples A-D, were quilted using polyester quilting yarn, and samples E-G, were laminated using adhesive. The samples were burned using a laboratory simulation of TB-603 mattress flammability test, known as the PFG #723 GEN TB-603 Test, and referred to hereinafter as the "PFG Test". All quantified backside temperatures and char strengths are measured using this method.

Using the PFG Test, the temperature behind the barrier can be measured using both contact or infrared measuring devices. The temperature measured behind the panel is an indication of the protective capability of the product. In Example 1, a three layer panel was laboratory laminated, and tested against a panel made from like materials that was quilted. The results are as follows:

| Sample ID | Ticking Basis Weight Osy | TB20 Fiberfill Basis Weight osy | Spunbond PP Basis Weight osy | Temp. at 50 sec Degrees F. | Char Strength Newtons |
|---|---|---|---|---|---|
| Quilted Ticking, Fiber Fill, & Backer ||||||
| A | 5.7 | 4.8 | 1.1 | 735 | 2.4 |
| B | 5.7 | 6.5 | 1.1 | 686 | 4.5 |
| D | 5.7 | 11.0 | 1.1 | 593 | 11.1 |
| Spray Adhesive Laminated Ticking, Fiber Fill & Backer ||||||
| E | 5.8 | 5.0 | 1.1 | 651 | 3.7 |
| F | 5.9 | 6.8 | 1.1 | 590 | 5.3 |
| G | 5.8 | 11.3 | 1.1 | 218 | 46.5 |

TB-603 Small Scale Test Results
Test Method: PFG#723

Comparing item A with item E, item B with item F, and item D with item G it is evident that the temperatures behind the panel are significantly reduced, and the strength after burning (char strength) is much improved when the panel is laminated versus quilted. Additionally, comparing item B with item E shows that equivalent performance at reduced basis weight is possible when laminating according to embodiments of the present invention versus quilting.

ADDITIONAL EXAMPLES

The following laminates were prepared from three categories of materials shown as; Ticking style, Fiberfill Style, and Backing fabric type.
Two sets of laminates were prepared. One set was quilted together using stitching, while the other set was flat laminated together.

| Ticking Style | |
|---|---|
| Style 24500 | 3.05 oz/sy; 69/31 polyester/polypropylene |
| | Fiber Fill Styles |
| Style 24000 | TB 20 Lofted Needlepunch flame barrier cushioning, 4.5 osy |
| Style 24001 | TB20NP, 7.2 osy |
| Style 24002 | Rayco NP, 7.2 osy |
| Style 24003 | Rayco NP, 9.0 osy |
| | Quiltbacker Style |
| Style 3710-50001 | 3.1 oz/sy; 55/25/20 wood pulp/tencel/polyester FR finished |

Laminated Ticking/Fiberfill 24000/FR Barrier Style 3710-50001

| Dispo 402994 Sample ID | Composite Basis Weight Osy | Temp. at 50 sec Degrees F. | Char Strength Newtons |
|---|---|---|---|
| Average | 10.6 | 622 | 9.3 |

Laminated Ticking/Fiberfill Style 24001/FR Barrier Style 3710-50001

| Dispo 402994 Sample ID | Composite Basis Weight Osy | Temp. at 50 sec Degrees F. | Char Strength Newtons |
|---|---|---|---|
| Average | 13.9 | 493 | 12.6 |

Laminated Ticking/Fiberfill Style 24002/FR Barrier Style 3710-50001

| Dispo 402996 Sample ID | Basis Weight Osy | Temp. at 50 sec Degrees F. | Char Strength Newtons |
|---|---|---|---|
| Average | 13.8 | 497 | 16.3 |

Laminated Ticking/Fiberfill Style 24003/FR Barrier Style 3710-50001

| Dispo 402997 Sample ID | Basis Weight Osy | Temp. at 50 sec Degrees F. | Char Strength Newtons |
|---|---|---|---|
| Average | 15.8 | 416 | 17.9 |

Quilted Ticking/Fiberfill Style 24000/FR Barrier Style 3710-50001 (QUILTED)

| Dispo 402994 Sample ID | Basis Weight Osy | Temp. at 50 sec Degrees F. | Char Strength Newtons |
|---|---|---|---|
| Average | 10.7 | 673 | 6.2 |

Quilted Ticking/Fiberfill Style 24001/FR Barrier Style 3710-50001 (QUILTED)

| Dispo 402995 Sample ID | Basis Weight Osy | Temp. at 50 sec Degrees F. | Char Strength Newtons |
|---|---|---|---|
| Average | 14.0 | 526 | 8.9 |

Quilted Ticking/Fiberfill Style 24002/FR Barrier Style 3710-50001 (QUILTED)

| Dispo 402996 Sample ID | Basis Weight osy | Temp. at 50 sec Degrees F. | Char Strength Newtons |
|---|---|---|---|
| Average | 13.7 | 597 | 10.1 |

-continued

Quilted Ticking/Fiberfill Style 24003/FR Barrier Style 3710-50001 (QUILTED)

| Dispo 402997 Sample ID | Basis Weight osy | Temp. at 50 sec Degrees F. | Char Strength Newtons |
|---|---|---|---|
| Average | 16.1 | 424 | 8.9 |

In each example the laminated structure versus the quilted structure shows improved performance. The lower temperature seen on the back side of the panel results in less chance of ignition or vaporization of the internal mattress components. The improved char strength improves the ability of the panel to resist cracking or breakthrough that can result in catastrophic failure when flame and heat pass through into the mattress or foundation.

The foregoing is illustrative of the present invention and is not to be construed as limiting thereof. Although a few exemplary embodiments of this invention have been described and several examples provided, those skilled in the art will readily appreciate that many modifications are possible in the exemplary embodiments without materially departing from the novel teachings and advantages of this invention.

That which is claimed is:

1. A method of producing a multi-layered flame and heat resistant panel, comprising:
    applying a chemical flame retardant finish to a first nonwoven fabric layer of non-flame resistant fibers;
    applying a chemical flame retardant finish to a second nonwoven fabric layer of non-flame resistant fibers; and
    laminating the first and second nonwoven fabric layers in face to face contacting relationship to form a non-quilted, non-perforated, multi-layered panel, wherein the panel maintains flame and heat resistant integrity when impinged with a gas flame in accordance with the testing protocol set forth in Technical Bulletin 603 of the State of California department of Consumer Affairs (TB-603).

2. The method of claim 1, further comprising positioning a layer of flame resistant cushioning material between the first and second nonwoven fabric layers prior to laminating the first and second nonwoven fabric layers.

3. The method of claim 1, wherein the first and second nonwoven fabric layers are laminated together using an adhesive, adhesive web, adhesive film, binder fiber, binder powder or adhesive agent.

4. The method of claim 1, wherein the first and second nonwoven fabric layers are laminated together using thermal or ultrasonic bonding.

5. A method of producing a multi-layered flame and heat resistant panel, comprising:
    laminating first and second nonwoven fabric layers in face to face contacting relationship to form a non-quilted, non-perforated, multi-layered panel; and
    applying a chemical flame retardant finish to the panel such that the panel maintains flame and heat resistant integrity when impinged with a gas flame in accordance with the testing protocol set forth in Technical Bulletin 603 of the State of California department of Consumer Affairs (TB-603).

6. The method of claim 5, further comprising positioning a layer of flame resistant cushioning material between the first and second nonwoven fabric layers prior to laminating the first and second nonwoven fabric layers.

7. The method of claim 5, wherein the first and second nonwoven fabric layers are laminated together using an adhesive, adhesive web, adhesive film, binder fiber, binder powder or adhesive agent.

8. The method of claim 5, wherein the first and second nonwoven fabric layers are laminated together using thermal or ultrasonic bonding.

9. A non-quilted, non-perforated mattress panel, comprising:
    a backing layer of nonwoven fabric comprising non-flame resistant, non-heat resistant fibers, wherein the backing layer has been chemically treated for flame retardancy with a chemical flame retardant finish or coating; and
    a decorative ticking layer laminated to the backing layer in face to face contacting relationship without perforating the backing layer or the decorative ticking layer, wherein the decorative ticking layer is a fabric consisting essentially of non-flame resistant, non-heat resistant fibers;
    wherein the panel maintains flame and heat resistant integrity when impinged with a gas flame on a front side thereof in accordance with testing protocol set forth in Technical Bulletin 603 of the State of California Department of Consumer Affairs (TB-603).

10. The mattress panel of claim 9, wherein, after being exposed to a flame for 50 seconds in accordance with the PFG Test, the panel maintains flame and heat resistant integrity, has a temperature on a back side of the panel that does not exceed about 435° C., and has a char strength that is greater than or equal to about two (2) Newtons.

11. The mattress panel of claim 9, wherein, after being exposed to a flame for 50 seconds in accordance with the PFG Test, the panel maintains flame and heat resistant integrity, has a temperature on a back side of the panel that does not exceed about 400° C., and has a char strength that is greater than or equal to about four (4) Newtons.

12. The mattress panel of claim 9, wherein, after being exposed to a flame for 50 seconds in accordance with the PFG Test, the panel maintains flame and heat resistant integrity, has a temperature on a back side of the panel that does not exceed about 370° C., and has a char strength that is greater than or opal to about eight (8) Newtons.

13. A mattress comprising one or more panels of claim 9, wherein the mattress maintains flame and heat resistant integrity when impinged with a gas flame in accordance with testing protocol set forth in Technical Bulletin 603 of the State of California Department of Consumer Affairs (TB-603).

14. A mattress comprising one or more panels of claim 9, wherein the mattress maintains flame and heat resistant integrity when impinged with a gas flame in accordance with testing protocol set forth in U.S. Consumer Product Safety Commission Standard for Flammability of Mattresses and Mattress/Foundation Sets (16 CFR 1633).

15. A mattress comprising one or more panels of claim 10.

16. A mattress comprising one or more panels of claim 11.

17. A mattress comprising one or more panels of claim 12.

18. The mattress panel of claim 9, wherein the backing layer and decorative ticking layer are treated completely throughout with flame retardant chemistry prior to being laminated together in face to face contacting relationship.

* * * * *

UNITED STATES PATENT AND TRADEMARK OFFICE
CERTIFICATE OF CORRECTION

| | | |
|---|---|---|
| PATENT NO. | : 8,008,218 B2 | Page 1 of 1 |
| APPLICATION NO. | : 11/870804 | |
| DATED | : August 30, 2011 | |
| INVENTOR(S) | : Small, Jr. et al. | |

It is certified that error appears in the above-identified patent and that said Letters Patent is hereby corrected as shown below:

Column 10, Line 26: Please correct "Dispo. 402994" to read -- Dispo. 402995 --

Signed and Sealed this
Seventeenth Day of January, 2012

David J. Kappos
*Director of the United States Patent and Trademark Office*